United States Patent [19]

Dalla Torre

[11] Patent Number: 6,008,288
[45] Date of Patent: *Dec. 28, 1999

[54] TRANSPARENT, COLORLESS, AMORPHOUS POLYAMIDES AND MOLDED ARTICLES

[75] Inventor: Hans Dalla Torre, Domat/EMS, Switzerland

[73] Assignee: EMS-Inventa AG, Zürich, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/936,552

[22] Filed: Sep. 24, 1997

Related U.S. Application Data

[63] Continuation-in-part of application No. 08/555,790, Nov. 9, 1995, Pat. No. 5,696,202.

[30] Foreign Application Priority Data

Feb. 1, 1995 [CH] Switzerland .............................. 0270/95
Sep. 19, 1995 [EP] European Pat. Off. ............... 95114719

[51] Int. Cl.⁶ ............................. C08L 77/00; C08G 69/26
[52] U.S. Cl. .......................... 524/538; 524/606; 525/432; 528/335; 528/346
[58] Field of Search ..................... 528/346, 335; 524/606, 538; 525/432

[56] References Cited

U.S. PATENT DOCUMENTS

| | | | |
|---|---|---|---|
| 2,512,606 | 9/1950 | Bolton et al. ............................ | 528/346 |
| 2,696,482 | 12/1954 | Pease ....................................... | 528/340 |
| 3,597,400 | 8/1971 | Kashiro et al. .......................... | 528/338 |
| 3,840,501 | 10/1974 | Shue et al. ............................... | 528/346 |
| 4,207,411 | 6/1980 | Shue ........................................ | 528/338 |
| 4,369,305 | 1/1983 | Pagilagan ................................ | 528/338 |
| 4,847,356 | 7/1989 | Hoppe et al. ........................... | 528/346 |
| 5,310,860 | 5/1994 | Maj et al. ................................ | 528/346 |
| 5,696,202 | 12/1997 | Torre ....................................... | 524/606 |
| 5,773,558 | 6/1998 | Torre ....................................... | 528/335 |

FOREIGN PATENT DOCUMENTS

| | | |
|---|---|---|
| 0 050 742 A1 | 5/1982 | European Pat. Off. . |
| 0 069 700 A1 | 1/1983 | European Pat. Off. . |
| 628602 | 12/1994 | European Pat. Off. . |
| 15 95 354 C3 | 10/1966 | Germany . |
| 2 034 541 | 7/1970 | Germany . |
| 37 17 928 A1 | 5/1987 | Germany . |
| 37 28 334 A1 | 8/1987 | Germany . |
| 43 10 970 A1 | 4/1993 | Germany . |

*Primary Examiner*—Tae Yoon
*Attorney, Agent, or Firm*—Browdy and Neimark

[57] ABSTRACT

Colorless, amorphous polyamides, their blends or alloys, and the molded articles with high alternate bending strengths that can be produced from them, are made available; they are preferably made up of cycloaliphatic diamines combined with aliphatic dicarboxylic acids and small amounts of aromatic dicarboxylic acids which show at the same time high strength, high rigidity, high heat distortion, and good solvent resistance.

15 Claims, No Drawings

TRANSPARENT, COLORLESS, AMORPHOUS POLYAMIDES AND MOLDED ARTICLES

This is a CIP of parent application Ser. No. 08 555,790, filed Nov. 09, 1995, now U.S. Pat. No. 5,696,202.

The subject of the present invention is transparent, colorless and amorphous polyamides and blends or alloys thereof with homopolyamides, and the molded articles that can be made thereof, which have high tenacity, good solvent resistance, and at the same time high rigidity and a high heat distortion temperature and high fatigue resistance strengths to alternating bending, and which in contrast to the prior art are colorless.

In European Patents EP 50 742 and EP 69 700 and U.S. Pat. Nos. 2,696,482, 3,597,400, 4,207,411 and 4,369,305, amorphous polyamides of aliphatic diamines and/or 4,4'-diaminodicyclohexylmethane (PACM) and aromatic dicarboxylic acids are described, but they have inadequate tenacity and transparency and are not colorless.

The polyamides of U.S. Pat. No. 2,512,606 and Published, German Patent Disclosure Application DE-OS 20 34 541 of aliphatic dicarboxylic acids and unsubstituted cycloaliphatic diamines with a high proportion of trans-trans-isomer are inadequately resistant to stress cracking in boiling water and alcohols, and in some cases are cloudy. Finally, the polyamides described in German Patent Disclosure DE 43 10 970 require an especially high proportion of trans-trans-isomer of from 35 to 60% of the 4,4'-diaminodicyclohexylmethane, which is attained only by means of special reaction conditions with expensive distillative fractionation in the production of the diamine. This makes these diamines not inconsiderably more expensive. They were commercially available under the tradenames PACM 50® (DuPont, Wilmington, Del.) and Wondamin® (New Japan Chemical Corporation, Osaka). Dicycan® (BASF), an unsubstituted bis(4-aminocyclohexyl)methane, has similar high trans-trans-isomer proportions. Although these diamines do bring about satisfactory tenacity of the polyamide, nevertheless the resistance to alternate bending stress and the dimensional stability under temperature of the shaped articles made from them is inadequate for certain applications, such as filter bowls in a relatively high temperature range.

German Patent Disclosure DE 15 95 354 describes a process for preparing cristal-clear polyamides from dicarboxylic acids and a defined isomer mixture of bis (aminocyclohexyl)propane, which can contain up to 80% caprolactam. The later "clouding" of those polyamides that contain dodecanedioic acid as the dicarboxylic acid is expressly mentioned.

German Patent Disclosure DE 37 17 928 covers transparent copolyamides of preferably aromatic dicarboxylic acids containing the isomers, no longer available today, of bis(4-amino-3-methyl-5-ethylcyclohexyl)methane, which have insufficiently high Tg values, and German Patent Disclosure DE 37 28 334 claims blends, with modified impact strength, of copolyamides of aromatic dicarboxylic acids and a mixture of hexamethylene diamine and PACM, which again have likewise low Tg values.

The object was accordingly to furnish polyamide molding compositions that make it possible to overcome the disadvantages of the prior art.

This object is attained by the transparent, colorless and amorphous polyamides, and their blends or alloys, and by the molded articles that can be made.

In particular, it is attained by polyamides, as well as blends and alloys, of at least one aliphatic homopolyamide or amorphous copolyamide with said polyamides, in which preferably long-chain aliphatic monomer units are combined with cycloaliphatic monomer units having at least one cyclohexane ring, and which as a result of this combination shows extremely high alternating bending strengths and at the same time high tenacity, high rigidity, high heat distortion under temperature and good solvent resistance.

Said transparent colorless, amorphous polyamides are made substantially from a) alkyl-substituted cycloaliphatic diamines, preferably those with from 14 to 22 carbon atoms, which are combined with long-chain unbranched aliphatic dicarboxylic acids that have from 7 to 36 atoms and preferably 8 to 14 carbon atoms, which preferred are replaced with small proportions of aromatic dicarboxylic acids, preferably a maximum of 20 mol % and especially preferably a maximum of 10 mol % thereof, or substantially made from b) long-chain unbranched aliphatic diamines, preferably those with from 8 to 14 carbon atoms,which can be replaced by a maximum of 90 mol.% of short chained branched or unbranched aliphatic diamines having from 4 to 6 carbon atomes like pentamethylenediamine or hexamethylenediamine, and cycloaliphatic dicarboxylic acids that have at least one cyclohexane ring. These acids are preferebly replaced with a maximum of 20 mol %, and most preferably with a maximum of 10 mol %, of at least one aromatic dicarboxylic acid.

The term alkyl-substituted cycloaliphatic diamines is understood to mean those that have one or more alkyl substituents, such as methyl, ethyl, propyl and isobutyl radicals, on at least one cyclohexane ring. The term cycloaliphatic dicarboxylic acids is understood to mean those that have one or more cyclohexane rings.

Surprisingly, it has been found that especially the transparent polyamides made up of octanedioic acid, nonanedioic acid, decanedioic acid, undecanedioic acid or dodecanedioic acid and a commercially available isomer mixture of the 3,3'- dimethyl-4,4'-diaminodicyclohexylalkane type, having a 1 to 3-C-atom-alkane, and in particular 3,3'-dimethyl-4, 4'-diaminodicyclohexylmethane or—in another expression bis-(3-methyl-4-aminocyclohexyl)methane, namely Laromin $C_{260}$® (BASF), alone or in blends or mixtures with homopolyamides, are suitable for molded articles that are highly ductile, extraordinarily resistant to alternate bending and nevertheless rigid and high heat distortion and resistant to stress cracking in alcohol, ketones and hot water.

Especially preferred are those polyamides wherein the at least one longchain unbranched aliphatic dicarbonic acid is replaced by amounts up to 20 mol % of at least one aromatic dicarboxylic acid.

The referring copolyamides show advantageously high Tg values, high tensile strengths and high tensile E-moduli.

Another preferred embodiment is the combination of at least one diamine selected from the group consisting of octanediamine, nonanediamine, decanediamine, undecanediamine or dodecanediamine with at least one cycloaliphatic dicarboxylic acid , having at lest one cyclohexane ring, preferred with 1,4-cyclohexane dicarboxylic acids for the polyamides according to the invention. Also here copolyamides containing up to 20 mol % of the replacing at least one aromatic dicarboxylic acid are especially preferred.

The polyamides according to the invention may be prepared by processes of the prior art under pressure in autoclaves or in reaction extruders at temperatures that are preferably above 260° C.

The blends or alloys with homopolyamides or amorphous copolyamides are prepared by the usual processes known from the prior art.

Said further homopolyamides advantageously used for this purpose are preferably selected from the group consisting of PA 610, PA 612, PA 912, PA 1212, PA 11, PA 12, PA MACM12, PA MACMI, PA MACMT, PA PACM12, PA PACMI, PA PACMT, PA PACP12, PA PACPI, PA PACPT; PA IPD12, PA IPDT, PA BN12 and PA TCD12.

The further amorphous copolyamides are selected from the group consisting of PA 12/MACMI, PA 12/MACMI/MACMT, PA 12/PACMI, PA 12/PACPI, PA 12/TCDI, PA 12/IPDI and PA 12/BNI.

The above abbreviations are the art-accepted ISO abbreviations. TCD stands for diaminomethyl-tricyclodecane. MACM is the methyl derivative of the bicyclic amine having a methylene group in its center, i.e. bis-(3-methyl-4-aminocyclo-hexyl)methane. IPD stands for isophorone diamine. Generally the second part of the PA-abbreviation describes the dicarboxylic acid, e.g. 12=dodecandioic acid, T=terephthalic acid, and I=isophthalic acid.

Polyamides, blends and alloys can optionally contain additives, preferably from the group of lubricants, UV and heat stabilizers, chain regulators, pigments, colorants impact strength modifiers, flame retardants and reinforcing agents; among the latter, glass, minerals, fibers and fillers are preferred.

The invention also encompasses molded articles that can be made from the polyamides, blends or alloys according to the invention.

The molded articles according to the invention are distinguished not only by very high alternate bending strengths, which are documented over at least 600,000 and preferably more than 800,000 alternate bending cycles (measured at 23° C. with dry test bars, 4 mm thick, in accordance with DIN 53442), but also at the same time by notch impact strengths of at least 10 and preferably 12 KJ/$m^2$ at 23°, and high heat distortion under temperature as a consequence of Tg values of over 175° C., with excellent resistance to stress cracking in most solvents.

This combination of important properties is made possible not at least by high molecular weights, or high (eta relative) solution viscosities, of the polyamides according to the invention, which are higher than 1.6 (measured in a 0.5% concentration in m-cresol). It has not been described thus Tar in the prior art.

The following examples are intended to explain but not to limit the concept of the invention.

EXAMPLE 1

Via a heated receiving vessel, 13,800 g of decane dicarboxylic acid, 14,590 g of bis-(3-methyl-4-aminocyclohexyl) methane (Laromin $C_{260}$®), 30 g of 50% aqueous $H_3PO_2$, 150 g of benzoic acid, and 10 l of demineralized water were placed in a pressure autoclave with a 130 l capacity, and stirred until homogeneous.

After a compression, decompression and degassing phase, the polyamide was pressed out as a strand, passed under cold water and granulated. The dried granulate had the following properties:

| granulate evaluation | | colorless brilliant transparent |
|---|---|---|
| eta relative viscosity | 0.5% m-cresol | 1.71 |
| melt viscosity at 270° C./122.6 N | (Pa · s) | 986 |
| Tg | (° C.) | 157.1 |
| cold crystallization point | (° C.) | no peaks in the melt |
| melting point | (° C.) | no peaks in the melt |
| terminal groups $NH_2$/COOH | ($\mu$ equiv/g) | 51/34 |
| $H_2O$ content | (weight %) | 0.010 |

Test bars were made from the granulate by injection molding: Thereby the test bars: showed the following mechanical properties:

| impact strength, dry 23° C./–40° C. | (kJ/$m^2$) | nb/nb (no break) |
|---|---|---|
| notched impact strength, dry 23° C./–40° C. | (kJ/$m^2$) | 12/10 |
| tensile strength at break, dry/conditioned 23° C. | (N/$mm^2$) | 48/45 |
| elongation at break, dry/conditioned 23° C. | (%) | 79/86 |
| tensile E-modulus, dry/conditioned 23° C. | (N/$mm^2$) | 1640/1640 |

Number of load change cycles per DIN 53442, dry, 23° C., using bars 4 mm thick, in a C. Schenk alternate load testing apparatus, type PWO 150/1966: 1,960,000

Stress cracking strength in methanol, acetone, ethyl acetate, toluene: no stress cracking Small DIN bars were placed in boiling water for 5 months; the test specimens remained transparent, showed no deformation at all, and retained 80% of the original notched impact strength.

EXAMPLE 2

An autoclave of 130 l volume was filled with 11.200 kg dodecanedioic acid 2.000 kg isophthalic acid (=10 mol.% of the total acid amount), 14.700 kg of bis-(3-methyl-4-aminocyclohexyl)-methane, 30 g of $H_3PO_2$ (50% solution in water), 150 g bezoic acid, 10 l demineralized water. Under stirring the autoclave was heated up slowly to 180° C., than to 280° C. and held there during 3 hours. After decompression a transparent polyamide strand was pressed out of the autoclave . The cooled strand was granulated and the granules were dried at 100° C. under vacuum.

| granule appearance | | brillant, transparent, clear |
|---|---|---|
| eta relative viscosity | (0.5% in m-creso) | 1.62 |
| Tg | (° C.) | 171 |
| terminal groups $NH_2$/COOH | ($\mu$ equiv/g) | 60/49 |
| $H_2O$ content | (weight %) | 0.010 |

-continued

| | | |
|---|---|---|
| HDT/A, dry/cond. | (° C.) | 127/125 |
| HDT/B, dry/cond. | (° C.) | 147/145 |

Test bars were made from the granulate by injection molding: Thereby the test bars showed the following mechanical properties:

| | | |
|---|---|---|
| impact strength, dry 23° C. | (kJ/m$^2$) | nb (no break) |
| notched impact strength, dry 23° C. | (kJ/m$^2$) | 7.9 |
| tensile strength at yield, dry/conditioned 23° C. | (N/mm$^2$) | 70/64 |
| elongation at yield, dry/conditioned 23° C. | (%) | 8/7 |
| tensile strength at break, dry/conditioned 23° C. | (N/mm$^2$) | 52/48 |
| elongation at break, dry/conditioned 23° C. | (%) | 68/111 |
| tensile E-modulus, dry/conditioned 23° C. | (N/mm$^2$) | 1730/1830 |

Number of load change cycles per DIN 53442, dry, 23° C., using bars 4 mm thick, in a C. Schenk alternate load testing apparatus, type PWO 150/1966: 1,500,000

EXAMPLE 3

The autoclave of example 2 was charged with 11.200 kg of dodecanedioic acid, 2.000 kg of terephthalic acid (=10 mol. % of the total acid amount), 14.700 kg of bis-(3-methyl-4-aminocyclohexyl)-methane, 30 g of H$_3$PO$_2$ (50% in water), 150 g benzoic acid, 10 l of demineralized water. The autoclave was heated up to 280° C. and kept at this temperature for 3 hours.

After degassing at 270 to 275° C. a transparent polyamide strand was pressed out. The strand was cooled by passing through cold water, pelletized and dried.

| | | |
|---|---|---|
| granule appearance | | transparent, clear |
| eta relative viscosity | (0.5% in m-cresol) | 1.66 |
| Tg | (° C.) | 171 |
| terminal groups NH$_2$/COOH | (µ equiv/g) | 63/53 |

Test bars were made from the granulate by injection molding: Thereby the test bars: showed the following mechanical properties:

| | | |
|---|---|---|
| impact strength, dry 23° C. | (kJ/m$^2$) | nb (no break) |
| notched impact strength, dry 23° C. | (kJ/m$^2$) | 10 |
| tensile strength at yield, dry/conditioned 23° C. | (N/mm$^2$) | 70/64 |
| elongation at yield, dry/conditioned 23° C. | (%) | 8/7 |
| tensile strength at break, dry/conditioned 23° C. | (N/mm$^2$) | 51/48 |
| elongation at break, dry/conditioned 23° C. | (%) | 27/83 |
| tensile E-modulus, dry/conditioned 23° C. | (N/mm$^2$) | 1720/1820 |

Number of load change cycles per DIN 53442, dry, 23° C., using bars 4 mm thick, in a C. Schenk alternate load testing apparatus, type PWO 150/1966: 1,799,500

EXAMPLE 4

This example shows a polyamide having excellent tensile properties.

In the autoclave of example 2 and 3 and according to the procedure of these examples 18.300 kg of dodecanedioic acid, 4.000 kg of isophthalic acid (=20 mol. % of the total acid amount), 14.700 kg of bis-(3-methyl4-aminocyclohexyl)-methane, 30 g of H$_3$PO$_2$, 150 g of benzoic acid and 10 l of demineralized water were charged. After heating up the mixture to 280° C. and polycondensation at about 280° C. the resulting polyamide granules show the following properties:

| | | |
|---|---|---|
| granule appearance | | transparent, clear |
| eta relative viscosity | (0.5% in m-cresol) | 1.61 |
| melt viscosity, 275° C./122,6 N | (Pas s) | 609 |
| Tg | (° C.) | 171 |
| onset Tg | (° C.) | 184.5 |
| terminal groups NH$_2$/COOH | (µ equiv/g) | 87/48 |
| water content | (weight %) | 0.03 |

Test bars were made from the granulate by injection molding: Thereby the test bars: showed the following mechanical properties:

| | | |
|---|---|---|
| impact strength, dry 23° C. | (kJ/m$^2$) | 50 |
| notched impact strength, dry 23° C. | (kJ/m$^2$) | 7.1 |
| tensile strength at yield dry/conditioned 23° C. | (N/mm$^2$) | 71/70 |
| elongation at yield, dry/conditioned 23° C. | (%) | 7/7 |
| tensile strength at break dry/conditioned 23° C. | (N/mm$^2$) | 61/51 |
| elongation at break, dry/conditioned 23° C. | (%) | 4/4 |
| tensile E-modulus, dry/conditioned 23° C. | (N/mm$^2$) | 1970/1970 |

Number of load change cycles per DIN 53442, dry, 23° C., using bars 4 mm thick, in a C. Schenk alternate load testing apparatus, type PWO 150/1966: 1,194,000

EXAMPLE 5

(Sebacic acid instead of dodecanedioic acid)

Analog the former examples the autoclave was charged with the other components and 12.122 kg of sebacic acid instead of dodecanedioic acid.

The polycondensation temperature was 280° C.

Properties of the granules:

| | | |
|---|---|---|
| granule appearance | | transparent, clear |
| eta relative viscosity | (0.5% in m-cresol) | 1.60 |
| Tg | (° C.) | 164,7 |
| HDT/A, dry/cond. | (° C.) | 118/110 |
| HDT/B, dry/cond. | (° C.) | 135/115 |

Test bars were made from the granulate by injection molding: Thereby the test bars: showed the following mechanical properties:

| | | |
|---|---|---|
| impact strength, dry 23° C. | (kJ/m$^2$) | nb (no break) |
| notched impact strength, dry 23° C. | (kJ/m$^2$) | 7.0 |
| tensile strength at yield, dry/conditioned 23° C. | (N/mm$^2$) | 68/64 |
| elongation at yield, dry/conditioned 23° C. | (%) | 7/7 |
| tensile strength at break, dry/conditioned 23° C. | (N/mm$^2$) | 48/48 |
| tensile elongation at break, dry/conditioned 23° C. | (%) | 82/92 |
| tensile E-modulus, dry/conditioned 23° C. | (N/mm$^2$) | 1710/1740 |

Number of load change cycles per DIN 53442, dry, 23° C., using bars 4 mm thick, in a C. Schenk alternate load testing apparatus, type PWO 150/1966: 1,203,500

EXAMPLE 6

Inn the same manner as in the foregoing examples the autoclave was charged with 11.200 kg of dodecandioic acid, 2.000 kg of TPA (=10 mol. % of the total acids), 2,200 kg of bis-(3-methyl-4-aminocyclohexyl)-methane, 6,020 kg of hexamethylenediamine, 30 g of $H_3PO_2$, 150 g of benzoic acid and 10 l of demineralized water.

The charge was polymerized under pressure at 285° C.

After a compression, a decompression and a degassing phase, the polyamide was pressed out as a strand, passed under cold water and granulated. The dried granulate had the following properties:

| granulate evaluation | | colorless brilliant transparent |
|---|---|---|
| eta relative viscosity | (0.5% in m-cresol) | 1.863 |
| melt viscosity at 275° C./122.6 N | (Pa · s) | 432 |
| Tg | (° C.) | 169 |
| terminal groups $NH_2$/COOH | (µ equiv/g) | 36/98 |
| $H_2O$ content | (weight %) | 0.010 |

Test bars were made from the granulate by injection molding: Thereby the test bars: showed the following mechanical properties:

| impact strength, dry 23° C. | ($kJ/m^2$) | nb (no break) |
|---|---|---|
| notched impact strength, dry 23° C. | ($kJ/m^2$) | 6 |
| tensile strength at break, dry 23° C. | ($N/mm^2$) | 32 |
| elongation at break, dry 23° C. | (%) | 105 |
| tensile E-modulus, dry 23° C. | ($N/mm^2$) | 1955 |

Number of load change cycles per DIN 53442, dry, 23° C., using bars 4 mm thick, in a C. Schenk alternate load testing apparatus, type pwo 150/1966: 770,000

I claim:

1. A transparent, colorless, amorphous copolyamide or blend thereof with at least one further polyamide, said amorphous copolyamide made from:

bis-(3-methyl-4-aminocyclohexyl)-methane and;

at least one unbranched aliphatic dicarboxylic acid having 7 to 14 carbon atoms, together with at least one aromatic dicarboxylic acid, wherein said at least one aromatic dicarboxylic acid is present in an amount no greater than 20 mol %;

wherein said copolyamide has a relative solution viscosity of more than 1.6 and wherein said at least one further polyamide is selected from the group consisting of homopolyamides and transparent copolyamides; and wherein standardized test specimens made from said copolyamide or blend or alloy thereof have an alternate bending strength of more than 600,000 cycles at 23° C.

2. The copolyamide according to claim 1, wherein said copolyamide has a relative solution viscosity of 1.71.

3. A copolyamide of claim 1, characterized in that standardized test specimens made from said copolyamides or blend or alloy thereof has an alternate bending strength of more than 800,000 cycles at 23° C.

4. A blend or alloy of said copolyamide and said at least one further polyamide, of claim 1, characterized in that the further polyamide is at least one homopolyamide selected from the group consisting of PA 69, PA 610, PA 612, PA 912, PA 1212, PA 11, PA 12, PA MACM12, PA MACMI, PA MACMT, PA PACM12, PA PACMI, PA PACMT, PA PACP12, PA PACPI, PA PACPT; PA IPD12, PA IPDT, or at least one further amorphous copolyamide selected from the group consisting of PA 12/MACMI, PA 12/MACMI/MACMT, PA 12/PACMI, PA 12/PACPI, PA 12/TCDI, PA 12/IPDI and PA 12/BNI.

5. A composition comprising the copolyamide according to claim 1 and at least one additive selected from the group consisting of lubricants, heat and UV stabilizers, chain regulators, pigments, colorants, impact strength modifiers, flame retardants, reinforcing agents, and fillers.

6. A copolyamide according to claim 1, wherein said at least one aromatic dicarboxylic acid is present in an amount of 10 mol % to 20 mol %.

7. The copolyamide according to claim 1, wherein said unbranched aliphatic dicarboxylic acid is heptanedioic acid, octanedioic acid, nonanedioic acid, decanedioic acid, undecanedioic acid, or dodecanedioic acid.

8. A copolyamide according to claim 1, wherein the aromatic dicarboxylic acid is terephthalic acid, isophthalic acid, or 2,6-naphthalene dicarboxylic acid.

9. A molded article prepared from the polyamide or a blend or alloy thereof with at least one polyamide of claim 1.

10. A molded article prepared from the polyamide or a blend or alloy thereof with at least one polyamide of claim 2.

11. A molded article prepared from the polyamide or a blend or alloy thereof with at least one polyamide of claim 5.

12. A molded article prepared from the polyamide or a blend or alloy thereof with at least one polyamide of claim 6.

13. A molded article prepared from the polyamide or a blend or alloy thereof with at least one polyamide of claim 7.

14. A molded article prepared from the polyamide or a blend or alloy thereof with at least one polyamide of claim 8.

15. A composition consisting essentially of a blend or alloy of a copolyamide according to claim 1 and at least one further polyamide, wherein said at least one further polyamide is a homo- or a copolyamide selected from the group consisting of linear aliphatic polyamides of the formula —[NH—$(CH_2)_x$—CO]$_n$—, wherein n is selected from the group consisting of 5, 10, and 11, linear aliphatic polyamides of the formula —[NH—$(CH_2)_y$—NH—CO—$(CH_2)_z$—CO]$_{n/2}$, wherein y is selected from the group consisting of 4, 6, 9, and 12 and z is selected from the group consisting of 4, 8, and 10, wherein y is 4 when z is 4, y is 6 when z is 4, 8, or 10, y is 4 or 6 when z is 4, y is 9 when z is 10, and y is 12 when z is 10; polyamides of bis(3-methyl-4-aminocyclohexyl)-methane and an acid selected from the group consisting of isophthalic acid, dodecanoic acid, and terephthalic acid; polyamides of 1,3-bis(aminomethyl) cyclohexamine and an acid selected from the group consisting of isophthalic acid, dodecanoic acid, and terephthalic acid; polyamides of 2,2-bis(p-aminocyclohexyl)propane and an acid selected from the group consisting of isophthalic acid, dodecanoic acid, and terephthalic acid; copolyamides of polyamidisophorone diamine and an acid selected from the group consisting of isophthalic acid, dodecanoic acid, and terephthalic acid; a polyamide of isophorone diamine with terephthalic acid; a polyamide of diamino methylnorbornane and dodecanoic acid; a polyamide of diaminomethyl tricyclodecane and dodecanoic acid, and optionally at least one further amorphous copolyamide selected from the group consisting of a polyamide of the formula —[NH—(CH$_2$)$_x$—CO]$_n$, wherein x is 11 reacted with an amide or an acid selected from the group consisting of bis-(3-methyl-4-aminocyclohexyl)methane and isophthalic acid, an amide selected from the group consisting of bis-(3-methyl-4-aminocyclohexyl)methane and isophthalic acid with a polyamide from bis-3-(methyl-4-aminocyclohexyl)-methane and terephthalic acid, an amide of 1,3-bis(aminomethyl)cyclohexane and isophthalic acid, an amide of diaminomethyl-tricyclodecane and isophthalic acid, and an amide of diaminomethylnorbornane and isophthalic acid, —[NH—(CH$_2$)$_{11}$—CO]—.

* * * * *